July 14, 1953     W. J. BRATH ET AL     2,645,537
DETACHABLE SERVICE TRAY FOR AUTOMOBILE DOORS
Filed Dec. 20, 1948
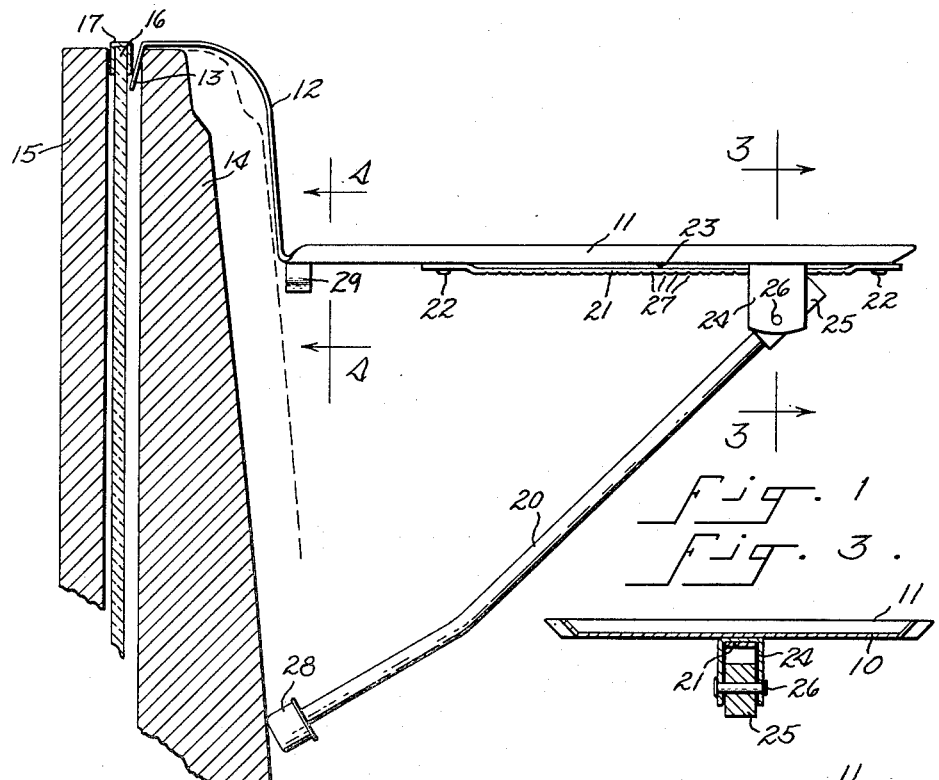
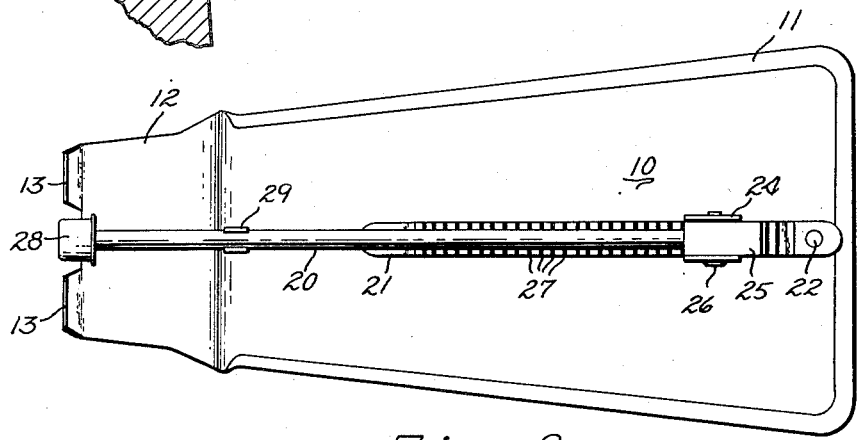
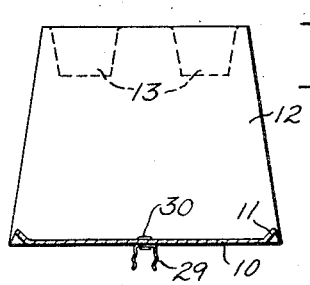
INVENTORS
William J. Brath &
Leonard J. Mayer
BY
Buckhorn and Cheatham
Attorneys Patented July 14, 1953

2,645,537

UNITED STATES PATENT OFFICE 2,645,537

DETACHABLE SERVICE TRAY FOR AUTOMOBILE DOORS

William J. Brath and Leonard J. Mayer, Portland, Oreg.

Application December 20, 1948, Serial No. 66,208

3 Claims. (Cl. 311—22)

The present invention relates to a service device for detachable association with a support, being particularly a service tray for mounting upon the ledge of the window of an automobile door or support of a similar nature.

The principal object of the present invention is to provide a relatively inexpensive tray of small size, the holding capacity thereof being sufficient to support several articles such as dishes, cups, glasses, napkins and utensils required to serve the majority of orders at a curb service restaurant.

A further object of the present invention is to provide a device the character described which may be readily and inexpensively formed from standard, readily available materials without wastage thereof.

A further object of the present invention is to provide a device of the character described which may be associated with varying types or sizes of automobile doors and will provide a stable support regardless of the configuration of the door.

The objects and advantages of the present invention will be more readily understood by inspection of the following specification taken in connection with the accompanying drawing wherein like numerals refer to like parts throughout, while the features of novelty will be more distinctly pointed out in the appended claims.

In the drawing:

Fig. 1 is a side elevation of the invention in use when mounted upon an automobile door illustrated in cross section;

Fig. 2 is a bottom view of the device when collapsed for storage;

Fig. 3 is a vertical section taken substantially along line 3—3 of Fig. 1; and

Fig. 4 is a vertical section taken substantially along line 4—4 of Fig. 1.

The tray portion of the device comprises a body 10 having its side and outer end edges bent upwardly to provide a continuous, stiffening and article-arresting flange 11. An integral portion of the inner end of the body is bent upwardly, then outwardly, then downwardly, to provide a transverse hook 12 adapted to be hung over the ledge of an automobile door or similar support. The tip of the hook portion preferably terminates in a spaced pair of diagonally directed tabs 13 facilitating entry of the tip portion into the space between the outer portion 14 and inner portion 15 of a car door. This space is normally partially occupied by a sliding window-pane 16 which may have a metallic bead 17 along its upper edge. The diagonally directed tabs 13 may be slid into the space between the upper end of the window-pane and one of the door portions by tipping the outer end of the tray slightly upward. When the tray is brought down to a level position the tips of the tabs 13 will project beneath the metallic bead to assist in holding the device in position. Even where there is no metallic bead on the pane the weight of the tray forcing the tips of the tabs 13 against the window-pane causes the device to rest in a stable condition. The bight of the hook portion is made wide enough to fit the widest car door ledge encountered, as indicated by the dash lines in Fig. 1, but the device will operate if the car door ledge is narrower, such as shown in full lines in Fig. 1.

The body portion and its integral hook are formed from a single, elongated strip of metal of suitable outline. In order that substantial savings may be effected, the outer end of the strip is wider than the inner end, the outer end being no wider than necessary to provide a portion of the tray capable of supporting even a large plate, and the inner end of the strip being just sufficiently wide to prevent lateral tipping of the tray when the hook portion is hung on a window ledge. The blank from which the tray is formed therefore preferably comprises a blank having essentially the outline of an isosceles trapezoid. A plurality of such blanks may be cut from a long strip of sheet metal along alternately directed, transverse lines so that the blanks will be formed with their outer and inner ends alternately reversed. After a blank is so formed a simple stamping operation is all that is required to bend the flange 11 and the hook portion 12 into shape. It is to be noted that the hook portion preferably extends above the plane of the tray portion so that when the tray is used inside of a car door it will maintain the articles thereon at a convenient height with respect to a person seated in the automobile.

The tray is braced in its position of use by a swinging supporting leg 20 which is adjustably attached to the lower side of the tray. The attachment for the leg preferably comprises an elongated bar 21 having its ends fastened to the lower side of the tray along the longitudinal centerline thereof by rivets 22. The major portion of the bar is offset from the plane of the tray to provide a space 23 between the bar and the bottom of the tray of sufficient width to receive the bight portion of a U-shaped strap forming a slide 24, the arms of which embrace the sides of the bar and extend below the plane thereof. An elongated, rectangular block 25 forming the pivoted end of leg 20 is embraced between the arms of the strap 24 and pivotally retained in position by a pivot 26 lying horizontally beneath the bar. The lower surface of the bar 21 is preferably provided with a plurality of laterally extending notches or serrations 27 and the end of the block 25 projects beyond the pivot 26 to a sufficient distance to permit the upper edge thereof frictionally to engage the surface of the bar when the supporting leg 20 is swung downwardly to a position at about 45 degrees to the plane of the tray. When the strap is adjustably positioned longitudinally of the bar the upper end edge of the block 25 may be swung upwardly to engage the serrations 27. The lower tip of the leg preferably supports a soft thimble 28 adapted to engage the upright surface of the door to brace the tray in its positions of use. When the tray is not being used the leg may be swung upwardly and separably held against the bottom of the tray by a spring clip device 29 mounted on the inner end of the tray portion by a rivet 30. The supporting leg is so mounted as to swing in a vertical plane and the end of the leg comprising the block 25 is engageable with the bar to limit swinging movement of the leg. The slide 24 may be slide longitudinally of the bar 21 so as to cause the thimble 28 to engage the surfaces of doors of various thicknesses.

Having illustrated and described a preferred embodiment of the invention, it will be apparent to those skilled in the art that the invention permits of modification in arrangement and detail. We claim as our invention all such modifications as come within the true spirit and scope of the appended claims.

We claim:

1. A service tray comprising a body having essentially the outline of an isosceles trapezoid, the narrow end of said body being bent upwardly, then outwardly, then downwardly, to provide a hook portion for engagement with an automobile window ledge and the major portion of said body having its edge bent upwardly to provide an outwardly widening tray, a bar secured to the lower surface of said tray along the longitudinal axis thereof, a slide movable longitudinally of said bar, and a supporting leg pivotally mounted on said slide beneath said bar at sufficient distance to permit said leg to swing in a vertical plane with the free end thereof extending beneath said hook portion, said bar being secured to said tray at its ends only and being spaced therefrom throughout the major portion of its length, and said slide comprising a U-shaped strap having its bight portion lying in the space between said bar and said tray and its arms extending below said bar.

2. A service tray comprising a body having essentially the outline of an isosceles trapezoid, the narrow end of said body being bent upwardly, then outwardly, then downwardly, to provide a hook portion for engagement with an automobile window ledge and the major portion of said body having its edge bent upwardly to provide an outwardly widening tray, a bar secured to the lower surface of said tray along the longitudinal axis thereof, a slide movable longitudinally of said bar, and a supporting leg pivotally mounted on said slide beneath said bar at sufficient distance to permit said leg to swing in a vertical plane with the free end thereof extending beneath said hook portion, said leg comprising a portion extending in the opposite direction from its pivot and engageable with the lower surface of said bar to limit swinging movement thereof, said bar being secured to said tray at its ends only and being spaced therefrom throughout the major portion of its length, said slide comprising a U-shaped strap having its bight portion lying in the space between said bar and said tray and its arms extending below said bar, and said supporting leg comprising a rectangular block lying between said arms and presenting a sharp edge for engagement with the lower surface of said bar when said leg is disposed at an angle thereto.

3. A service tray comprising a body having essentially the outline of an isosceles trapezoid, the narrow end of said body being bent upwardly, then outwardly, then downwardly, to provide a hook portion for engagement with an automobile window ledge and the major portion of said body having its edge bent upwardly to provide an outwardly widening tray, a bar secured to the lower surface of said tray along the longitudinal axis thereof, a slide movable longitudinally of said bar, and a supporting leg pivotally mounted on said slide beneath said bar at sufficient distance to permit said leg to swing in a vertical plane with the free end thereof extending beneath said hook portion, said bar being secured to said tray at its ends only and being spaced therefrom throughout the major portion of its length, said slide comprising a U-shaped strap having its bight portion lying in the space between said bar and said tray and its arms extending below said bar, said supporting leg comprising a rectangular block extending between said arms and presenting a sharp, upper, end edge for engagement with the lower surface of said bar when said leg is disposed at an angle thereto, and said bar having a plurality of transverse serrations with which said edge may engage.

WILLIAM J. BRATH.
LEONARD J. MAYER.

References Cited in the file of this patent

UNITED STATES PATENTS

| Number | Name | Date |
| --- | --- | --- |
| D. 26,850 | Campbell | Mar. 30, 1897 |
| 346,481 | L'Africain | Aug. 3, 1886 |
| 579,120 | Rhine | Mar. 16, 1897 |
| 1,436,601 | Niemeyer | Nov. 21, 1922 |
| 1,453,186 | Ruffin, Jr. | Apr. 24, 1923 |
| 1,666,084 | Bright | Apr. 17, 1928 |
| 1,770,119 | Zimmerli | July 8, 1930 |
| 1,836,511 | Severns | Dec. 15, 1931 |
| 1,843,391 | Gayle | Feb. 2, 1932 |
| 1,921,462 | Graham | Aug. 8, 1933 |
| 1,934,271 | McGinley | Nov. 7, 1933 |
| 1,965,955 | De Foe et al. | July 10, 1934 |
| 1,974,213 | Gilbert | Sept. 18, 1934 |
| 2,049,386 | Temperli | July 28, 1936 |
| 2,099,433 | Bloomfield | Nov. 6, 1937 |
| 2,511,919 | Jones et al. | June 20, 1950 |